No. 691,261. Patented Jan. 14, 1902.
W. F. GRAHAM.
MACHINERY FOR THE MANUFACTURE OF COVERINGS FOR FLOORS OR LIKE SURFACES.
(Application filed July 26, 1901.)
(No Model.)
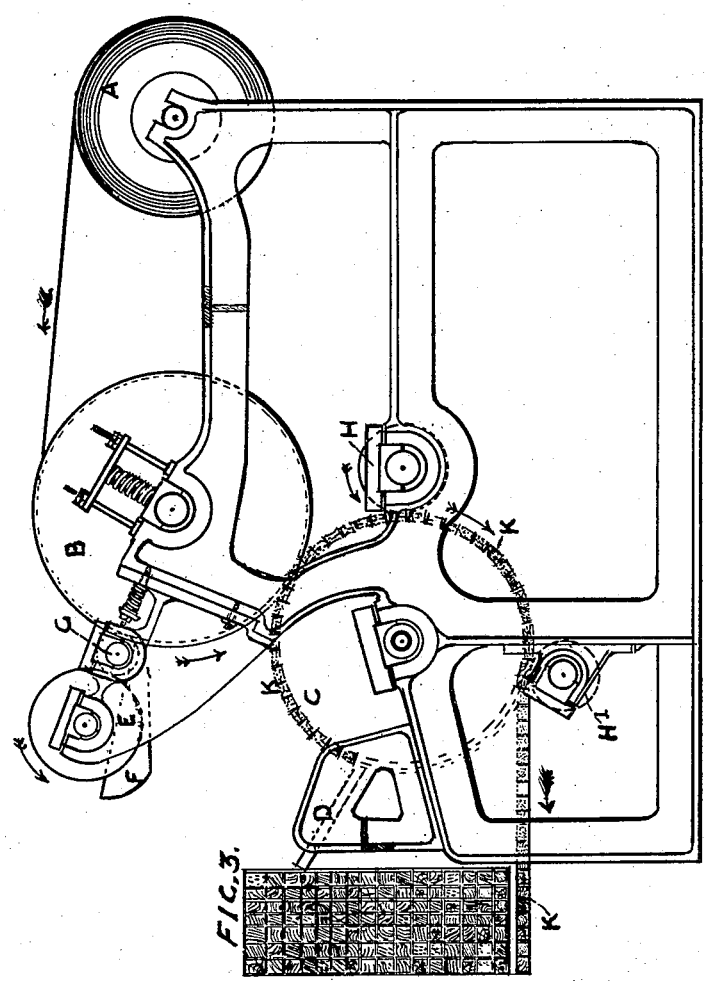
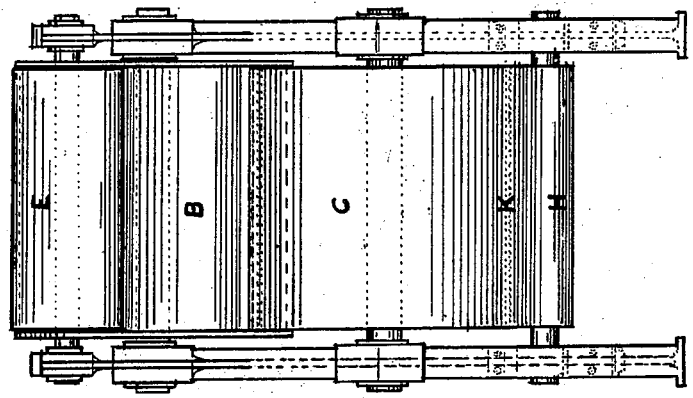

UNITED STATES PATENT OFFICE.

WILLIAM FOTHERGILL GRAHAM, OF GOSFORTH, ENGLAND.

MACHINERY FOR THE MANUFACTURE OF COVERINGS FOR FLOORS OR LIKE SURFACES.

SPECIFICATION forming part of Letters Patent No. 691,261, dated January 14, 1902.

Application filed July 26, 1901. Serial No. 69,831. (No model.)

*To all whom it may concern:*

Be it known that I, WILLIAM FOTHERGILL GRAHAM, timber merchant, a subject of the King of Great Britain and Ireland, residing at Rosgill, Elmfield road, Gosforth, in the county of Northumberland, England, have invented certain new and useful Improvements in Machinery for the Manufacture of Coverings for Floors or Like Surfaces; and I do hereby declare the following to be a full, clear, and exact description of the invention, such as will enable others skilled in the art to which it appertains to make and use the same.

My invention consists in producing a covering for floors and similar surfaces resembling mosaic work, in which blocks or cubes of wood, cut with or across the grain, and also mosaic tesseræ are attached by glue, mastic, or other adhesive composition to canvas or similar suitable material, the wood blocks or tesseræ being thereon preferably spaced with interstices between or close together and further secured, when necessary, by nailing, whereby a firm footing tread is formed. The method of producing such floor-covering may be by a machine in which the strips of canvas or other suitable material are coiled in a roll from which they are uncoiled and pass over a roller, on which they are smeared with glue, mastic, or other adhesive composition by a roller revolving in a trough containing the composition in a melted state and delivered to another roller, which spreads it evenly over the surface. The canvas thus smeared passes over and around a roller onto which the blocks are delivered by a chute, and each series of blocks or tesseræ attach themselves to the canvas and pass onto a roller, which presses them closely against the adhesive surface, and so over another roller, which keeps the canvas stretched tightly, when it may be rolled or, as I prefer, kept flat until the blocks or tesseræ have become perfectly set and attached to the canvas. At this or at any intermediate stage the blocks may be further secured by nailing them to the canvas, if necessary. The canvas may be coiled in strips of the full required width or may be afterward cut to any width.

The accompanying drawings show a form of machine which will carry out the production of floor-covering according to my invention and illustrate the operations to be performed.

Figure 1 is a side elevation; Fig. 2, an end view of Fig. 1; and Fig. 3 is a plan of a portion of a strip of floor-covering completed, showing the blocks K arranged with interstices between both longitudinally and transversely, which may be when laid filled with some cementing composition, making a perfectly level surface.

A is the roll of canvas unrolling over the roller B in the direction of the arrow and around the roller C. In its progress it receives by the roller E, revolving in the trough F, a coating of the adhesive composition contained therein, which is leveled over its surface by another roller G. The roller C, when the blocks or tesseræ are to be spaced, has projections on its surface, both circumferentially and transversely, into the spaces between which the blocks or tesseræ arrange themselves as they arrive from the chute D, into which they may be filled by hand or by some automatic device, and on coming in contact with the prepared canvas they attach themselves to it across the entire width of the strip and travel on with the canvas to the roller H, which presses them into close contact, the roller H' keeping the canvas tightly stretched. The rollers B, E, and G and the wheel C are all driven by geared trains of wheels (not shown) at proper speeds and provided with yielding springs, where necessary, to regulate the tension and avoid breakage or tearing of the canvas.

The blocks or cubes and mosaic tesseræ may be stained in different colors, so as to form an ornamental surface, like mosaic work.

What I claim, and desire to secure by Letters Patent, is—

1. In a machine of the character described, the combination with a roller over which a fabric is adapted to pass, and a roller for spreading adhesive composition on said fabric, of a second roller around which the fabric is adapted to pass from the first roller, and means for feeding blocks or tesseræ upon the surface of the second roller between said roller and the fabric, substantially as described.

2. In a machine of the character described, the combination with a frame, a roller A mounted in said frame and adapted to carry a roll of fabric, a roller B also mounted in said frame over which the fabric is arranged to pass, and a roller for spreading adhesive composition on said fabric, of a roller C around which the fabric is adapted to pass from the roller B, and means for feeding blocks or tesseræ upon the surface of the roller C between said roller and said fabric, substantially as described.

3. In a machine of the character described, the combination with a roller over which a fabric is adapted to pass, and a roller for spreading adhesive composition upon said fabric; of a second roller around which the fabric is adapted to pass from the first roller, ribs on the second roller, and means for feeding blocks or tesseræ to the second roller and beneath said fabric, substantially as described.

4. In a machine of the character described, the combination with a roller over which a fabric is adapted to pass, and a roller for spreading adhesive composition upon said fabric, of a second roller around which the fabric is adapted to pass from the first roller, means for feeding blocks or tesseræ upon the second roller between said roller and the fabric, and a roller pressing said fabric against said blocks or tesseræ as they pass around the second roller, substantially as described.

5. In a machine of the character described, the combination with a roller over which a fabric is adapted to pass, and a roller for spreading adhesive composition upon said fabric, of a second roller around which the fabric is adapted to pass from the first roller, ribs on the second roller, means for feeding blocks or tesseræ to the second roller between said fabric and the roller, and a roller for pressing said fabric against said blocks or tesseræ as they pass over the second roller, substantially as described.

6. In a machine of the character described, the combination with a roller, over which a fabric is adapted to pass, a trough containing adhesive composition and a roller for spreading said adhesive composition upon said fabric, of a second roller around which the fabric is adapted to pass from the first roller, means for feeding blocks or tesseræ upon the second roller between said roller and the fabric, and a roller pressing said fabric against said blocks or tesseræ as they pass around the second roller, substantially as described.

7. In a machine of the character described, the combination with a roller over which a fabric is adapted to pass, a trough containing adhesive composition, a roller E in said trough for feeding said composition and a roller G for spreading the composition on the fabric, of a second roller around which the fabric is adapted to pass from the first roller, means for feeding blocks or tesseræ upon the second roller between said roller and the fabric, and a roller pressing said fabric against said blocks or tesseræ as they pass around the second roller, substantially as described.

8. In a machine of the character described, the combination with a roller over which a fabric is adapted to pass, a trough containing adhesive composition, rollers for spreading said adhesive composition upon said fabric, of a second roller around which the fabric is arranged to pass from the first roller, ribs on the second roller, means for feeding blocks or tesseræ on the second roller between said ribs and between the surface of said roller and the fabric, and a roller for pressing said fabric against said blocks or tesseræ as they pass around the said roller, substantially as described.

In testimony whereof I affix my signature in presence of two witnesses.

WILLIAM FOTHERGILL GRAHAM.

Witnesses:
WILLIAM DAGGETT,
I. J. DUNSON.